United States Patent

Sevilla

[15] 3,693,098

[45] Sept. 19, 1972

[54] DATA RECOVERY TIMING CONTROL CIRCUIT

[72] Inventor: Ernesto G. Sevilla, 927 Ridgewood Rd., Herkimer, N.Y. 13350

[22] Filed: Jan. 8, 1971

[21] Appl. No.: 104,929

[52] U.S. Cl. ..................328/130, 307/265, 307/269, 307/273, 307/293, 328/63, 328/72, 178/69.5 R

[51] Int. Cl. .......G01r 29/02, H03k 5/00, H03k 5/13

[58] Field of Search......307/208, 273, 265, 269, 293; 328/63, 72, 130, 134, 139; 325/321, 325; 178/69.5 R

[56] References Cited

UNITED STATES PATENTS 3,226,577 12/1965 Azuma et al...........307/273 X 3,317,843 5/1967 Emmons................307/273 X 3,543,054 11/1970 Schrader................307/273 X 3,108,265 10/1963 Moe.......................307/273 X 3,488,440 1/1970 Logan et al............325/325 X 3,544,717 12/1970 Smith....................178/69.5 R

*Primary Examiner*—Stanley D. Miller, Jr.

*Attorney*—Gottieb, Rackman & Reisman and Harry M. Weiss

[57] ABSTRACT

A data block bit sequence detector requiring the use of only two re-triggerable one-shot multivibrators. The multivibrators are connected in series, and the output of the second controls the width of the pulse generated by the first. A block of data is determined to be present if data bits are detected at intervals of at most 200 microseconds for a period of 2 milliseconds. Thereafter, if a bit is not detected for 1 millisecond, it is an indication that the end of the block has been reached. The multivibrator feedback allows the three timing functions to be accomplished with only two multivibrators.

22 Claims, 1 Drawing Figure

PATENTED SEP 19 1972 3,693,098
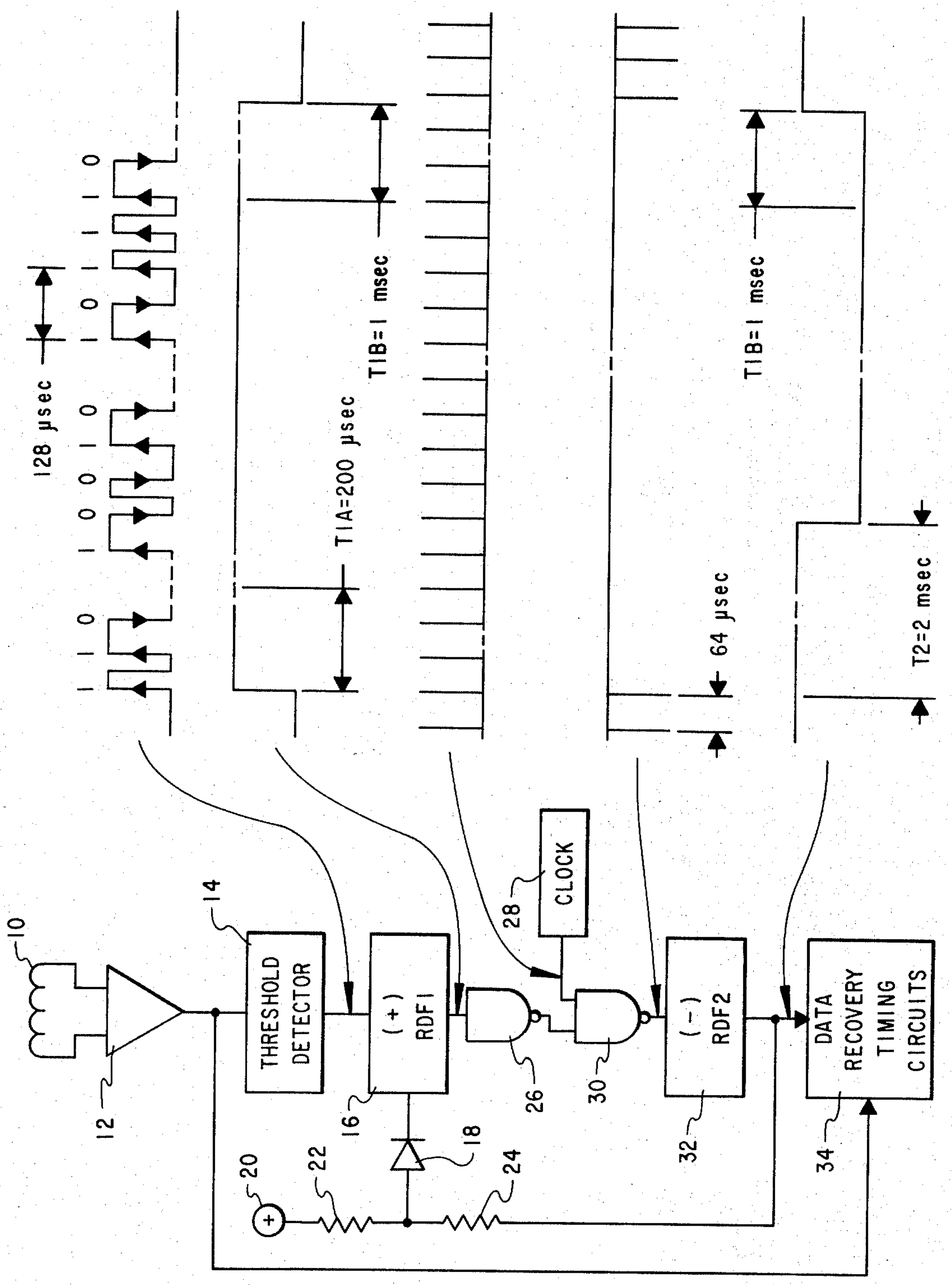
INVENTOR
ERNESTO G. SEVILLA
BY Gottlieb, Rackman & Reisman
Harry M. Weiss
ATTORNEYS

DATA RECOVERY TIMING CONTROL CIRCUIT

This invention relates to data recovery timing control circuits, and more particularly to such circuits which provide for different timing intervals at the leading and trailing edges of blocks of data.

In magnetic recording systems data bits are generally recorded in blocks, with gaps separating successive blocks. As soon as a predetermined number of bit signals exceeding a threshold value and a minimum data rate have been detected, it is an indication that a block of data is being read. Similarly, when the rate of minimum-magnitude bit signals falls too low, it is an indication that the end of the block has been reached.

When a high-speed search is being performed, typically data blocks are counted as they pass by a read head. It is important that the correct number of data blocks be counted. If, for example, a portion of the tape in the middle of a block is defective, the bit signals which should be detected may not exceed the threshold value. In such a case, the system might determine that a gap has been reached and one block of data will actually be counted as two blocks. It is for this reason that a momentary loss of data bits should not be treated as the end of a block.

In a typical system, the following two criteria might be imposed: (1) data bit signals exceeding the threshold value must be detected at a minimum data rate (e.g., one data bit/64 microseconds) for at least 2 milliseconds before the system will consider that a new block is being read, while (2) the loss of data bit signals for 1 millisecond will be considered to indicate that the end of the data block has been reached. Such a circuit would be only one of many data recovery timing circuits included in an overall system. Other timing and threshold circuits are required for other purposes. The block detector circuit described above is only illustrative of that class of circuits which provide different timing intervals at the leading and trailing edges of data blocks. In its broad aspects, the present invention can be considered to be a bit sequence detector circuit which requires the continuous detection of successive bit signals exceeding a minimum rate for a first time interval to indicate a first condition and the absence of such bit signals for a second time interval to indicate a second condition.

With three different timing functions having to be performed, it is generally necessary to provide at least three one-shot multivibrators inter-connected so as to allow three different time intervals to be measured — the time period between successive bit signals, the time period during which successive bit signals are present at the start of a data block, and the time period during which no bit signals are detected at the end of the data block.

It is a general object of my invention to provide a bit sequence detector of the type described which requires the use of only two multivibrators.

Briefly, in accordance with the principles of my invention and with reference to the illustrative pulse widths, a first re-triggerable one-shot multivibrator having a pulse width of 200 microseconds is utilized to detect successive data bit signals occurring at a rate exceeding the minimum data rate. Before data bit signals are detected, the second multivibrator is triggered at regular clock intervals. But as soon as the first multivibrator is successively triggered by data bit signals, the second multivibrator is allowed to time out. This occurs after two milliseconds and is an indication that a new data block has been entered.

When the second multivibrator times out, it causes the pulse width of the first multivibrator to be increased to 1 millisecond. This means that the second multivibrator is not triggered again until 1 millisecond has elapsed without the detection of a data bit signal. When 1 millisecond has elapsed in this manner, the first multivibrator times out and the second multivibrator is then continuously re-triggered. This, in turn, causes the first multivibrator timing interval to be reset at 200 microseconds.

A DC level is normally present at the output of the second multivibrator. When the DC level terminates it is an indication that a data block is being read. This happens only after data bit signals occurring at least once every 64 microseconds have been detected for 2 milliseconds. When the DC level again appears at the output of the second multivibrator, it is an indication that the end of the data block has been reached. This happens only after no bit signal has been detected for 1 millisecond (to allow for a momentary loss of data bit signals as a result of dirt, defective tape, etc. without resulting in the erroneous counting of two data blocks). The three timing functions are accomplished with the use of only two re-triggerable one-shot multivibrators by having the state of the second multivibrator determine the timing period of the first multivibrator.

It is a feature of my invention to provide two series-connected multivibrators in a bit sequence detector with the timing period of the first multivibrator being a function of the state of the second multivibrator.

It is another feature of my invention to continuously apply triggering pulses to the second multivibrator and to prevent this multivibrator from being triggered if the first multivibrator has been triggered.

Further objects, features and advantages of my invention will become apparent upon consideration of the following detailed description in conjunction with the drawing which depicts an illustrative embodiment of the invention together with pulse waveforms at various points in the circuit.

Recorded information is read by head 10 and amplified by amplifier 12. The resulting signal is then transmitted both to threshold detector 14 and data recovery timing circuits 34. Threshold detector 14 functions to generate a square-wave signal at its output, as shown, if the input signal exceeds a minimum percentage (for example, 30 percent) of the nominal value. The signal at the output of amplifier 12 is sent to the additional data recovery timing circuits 34 for further processing. For example, other threshold detectors may be provided along with tracking window circuits, counters, etc. The functions performed by multivibrators 16 and 32 in the drawing are only a few of the many which are generally necessary in the data recovery process.

The signal at the output of detector 14, as shown in the drawing, is of the phase modulation type. An upward transition symbolizes a bit value of 1 and a downward transition symbolizes a bit value of 0. At the nominal data rate, data bits occur at 64-microsecond intervals. In the event two bits of the same value follow each other, a phase transition is required between them.

The signal at the output of he detector is applied to the input of multivibrator 16. This one-shot multivibrator is triggered by a positive step, that is, when an upward transition is present in the output of threshold detector 14. The multivibrator produces a pulse at its output of predetermined width. A single pulse is generated for each trigger input. If a trigger input is received while a pulse is already being generated at the output of the multivibrator, the timing of the pulse begins anew; that is, the pulse is extended for a time interval equal to the predetermined pulse width.

Assuming that the output of multivibrator 32 is high, as it is before any data bits are detected, the junction of resistors 22 and 24 is at a greater potential than it is when the output of the multivibrator is low. Diode 18 is forward biased and a positive potential is extended to the control input of the RDF1 multivibrator 16. The potential at this control input determines the width of the pulse generated by the multivibrator. When diode 18 is forward biased by the current which flows from source 20 when the output of multivibrator 32 is high, the pulse width of multivibrator 16 is 200 microseconds. This time period is designated T1A in the waveforms of the drawing.

If data bits are received every 64 microseconds, it will be apparent that the maximum interval between two upward transitions is 128 microseconds — in the case of a 101 bit sequence. For any other sequence, upward transitions must occur within less than 128 microseconds. For example, for an all 0 sequence, upward transitions occur every 64 microseconds — between successive data bits. (The phase transitions, as long as they are in the upward direction, also trigger multivibrator 16.) Since the timing period of the multivibrator is 200 microseconds and upward transitions occur continuously within this time period as long as a block of data is being read properly, multivibrator 16 is continuously re-triggered and the pulse at its output is continuously extended. This is shown in the drawing; the period T1A (200 microseconds) exceeds the time interval between any successive pair of upward transitions and consequently the output of the RDF1 multivibrator remains high.

Before data bits are detected, the output of multivibrator 16 is low and the output of inverter 26 is high. The clock pulses generated by clock 28 at 64-microsecond intervals cause the output of gate 30 to be pulsed low as long as that input of the gate connected to the output of gate 26 remains high. Thus before multivibrator 16 is triggered, negative pulses are applied to the trigger input of the RDF2 multivibrator at 64-microsecond intervals. This multivibrator is similar to multivibrator 16 except that it is triggered by negative pulses, and the width T2 of the pulse generated at its output is 2 milliseconds. Before any data bits are detected, since trigger inputs are applied to the multivibrator at 64-microsecond intervals, the pulse at its output is continuously extended and remains high. It is this high output that controls the pulse width of multivibrator 16 to be 200 microseconds.

But as soon as the first positive step at the trigger input of multivibrator 16 is applied, the output of gate 26 goes low. At this time, the output of gate 30 remains high. Since no more trigger pulses are applied to the trigger input of multivibrator 32, its output remains high for only an additional 2 milliseconds after the last clock pulse. At the end of this interval (provided multivibrator 16 has not timed out, i.e., data bits have been received at at least the minimum rate), the pulse terminates and the output of multivibrator 32 goes low.

When the output of the multivibrator goes low it is an indication to the data recovery timing circuits 34 that a block of data has been accessed. It is apparent that data bits must be detected at a fast enough rate for 2 milliseconds before the timing circuits are so notified. If at any time two upward transitions at the output of detector 14 are not detected within 200 microseconds, the output of gate 26 goes high and the next clock pulse retriggers multivibrator 32. In such a case the multivibrator pulse is extended for another 2 milliseconds. A block of data is indicated only if upward transitions are detected no farther apart than 200 microseconds for a total interval of 2 milliseconds.

When the output of multivibrator 32 goes low, diode 18 is reverse biased. It is at this time that the width of the pulse generated by multivibrator 16 is extended to 1 millisecond. Thus only if no upward transition at the output of detector 14 is detected within a period of 1 millisecond does the output of gate 26 go high to allow the next clock pulse to trigger multivibrator 32. In the drawing, the extended pulse width of multivibrator 16 is shown by the notation T1B. It is shown as extending from the last upward transition in the output of detector 14. If no additional upward transition is detected for one millisecond, then the first clock pulse which occurs after the trailing edge of the pulse at the output of multivibrator 16 triggers multivibrator 13 whose output then goes high once again. This is a signal to timing circuits 34 that the end of the data block has been detected. Also, the width of the pulse generated by multivibrator 16 is reduced to 200 microseconds so that data bits at the start of the next block will have to be detected at a fast enough rate for 2 milliseconds) before the output of multivibrator 32 goes low again.

It should be noted that were the pulse width of multivibrator 16 to remain at 1 millisecond no matter what the output of multivibrator 32, there would still be different timing intervals at the leading and trailing edges of the data blocks. However, multivibrator 16 would be re-triggered as long as upward transitions are detected within intervals of 1 millisecond. Consequently, if in a period of 2 milliseconds only two upward transitions were detected, the output of multivibrator 32 would go low to indicate the start of a block of data. This is a very unreliable criterion. The start of a data block should be indicated only when an orderly sequence of data bits is detected. This necessarily entails the presence of upward transitions at intervals of at most 200 microseconds. Multivibrators 16 and 32 together determine the start of a data block only if upward transitions are detected at intervals of at most 200 microseconds for a total period of 2 milliseconds. Thereafter, the only criterion for the end of the data block is the absence of an upward transition for 1 millisecond — determined by the extended pulse width of multivibrator 16. While there are three time intervals (200 microseconds, 1 millisecond and 2 milliseconds) which are of importance in determining the start and end of a data block, all three timing functions are accomplished with the use of only two re-triggerable one-shot multivibrators by having the output of one of the multivibrators control the pulse width of the other.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A data block bit sequence detector comprising first re-triggerable one-shot multivibrator means responsive to the presence of a data bit for generating at its output a pulse of a width dependent upon the magnitude of a control signal applied to a control terminal thereof, second re-triggerable one-shot multivibrator means for generating at its output a pulse responsive to the application of a trigger signal thereto, means for continuously applying trigger signals to said second multivibrator means only in the absence of a pulse at the output of said first multivibrator means, and means responsive to the presence and absence of a pulse at the output of said second multivibrator means for controlling the magnitude of the control signal applied to said control terminal of said first multivibrator means.

2. A data block bit sequence detector in accordance with claim 1 wherein the width of the pulse generated by said first multivibrator means is T1A seconds in the presence of a pulse at the output of said second multivibrator means and is T1B seconds in the absence of a pulse at the output of said second multivibrator means, and the width of the pulse generated by said second multivibrator means is T2 seconds, where T2 is greater than T1B and T1B is greater than T1A.

3. A data bit sequence detector comprising first circuit means having two states; said first circuit means normally being in a first state, being responsive to a data bit for switching to a second state, and normally remaining in said second state for T1A seconds after the last data bit; second circuit means having two states; said second circuit means normally being in a first state; means for placing said second circuit means in a second state responsive to said first circuit means being in its first state, said second circuit means thereafter remaining in its second state until said first circuit means has been switched to and remained in its second state for T2 seconds; and means responsive to said second circuit means being in its first state for causing said first circuit means to remain in its second state for T1B seconds rather than T1A seconds after the last data bit.

4. A data bit sequence detector in accordance with claim 3 wherein T2 is greater than T1B and T1B is greater than T1A.

5. A data bit sequence detector comprising first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said first pulse.

6. A data bit sequence detector in accordance with claim 5 wherein the absence of a pulse at the output of said second multivibrator means controls the width of the pulse generated by said first multivibrator means to be greater than the width of the pulse generated by said first multivibrator means in the presence of a pulse at the output of said second multivibrator means.

7. A data bit sequence detector in accordance with claim 6 wherein the shorter of the two pulse widths generated by said first multivibrator means is related to the normal rate of the data bits, said predetermined time interval is related to the time interval during which data bits should be detected at a normal rate to indicate the start of a data block, and the longer of the two pulse widths generated by said first multivibrator means is related to the time interval during which no data bit should be detected to indicate the end of a data block.

8. A data bit sequence detector in accordance with claim 5 wherein the shorter of the two pulse widths generated by said first multivibrator means is related to the normal rate of the data bits, said predetermined time interval is related to the time interval during which data bits should be detected at a normal rate to indicate the start of a data block, and the longer of the two pulse widths generated by said first multivibrator means is related to the time interval during which no data bit should be detected to indicate the end of a data block.

9. A data bit sequence detector comprising first re-triggerable one-shot multivibrator means responsive to the presence of a data bit for generating at its output a first signal of predetermined duration, second re-triggerable one-shot multivibrator means for generating at its output a second signal of greater duration, and means for continuously applying trigger pulses to said second one-shot multivibrator means only in the absence of said first signal at the output of said first one-shot multivibrator means.

10. A data bit sequence detector in accordance with claim 9 further including means responsive to the absence of said second signal at the output of said second one-shot multivibrator means for indicating the presence of a data bit sequence.

11. A data bit sequence detector in accordance with claim 10 wherein the predetermined duration of said first signal exceeds the normal time interval between successive data bits, and the time interval between successive trigger pulses is less than the duration of said first signal.

12. A data bit sequence detector in accordance with claim 9 wherein the predetermined duration of said first signal exceeds the normal time interval between successive data bits, and the time interval between successive trigger pulses is less than the duration of said first signal.

13. A data bit sequence detector comprising first means for maintaining a first signal at its output as long as successive data bits are received within a first predetermined time interval, means connected to said first means for generating trigger pulses at a pre-set rate only in the absence of said first signal at the output of said first means, and second means connected to said trigger pulse generating means for maintaining a second signal at its output as long as successive trigger pulses are generated within a second predetermined time interval.

14. A data bit sequence detector in accordance with claim 13 further including means connected to said second means and responsive to the absence of said second signal at the output of said second means for indicating the presence of a data bit sequence.

15. A data bit sequence detector in accordance with claim 14 wherein said second predetermined time interval exceeds said first predetermined time interval.

16. A data bit sequence detector in accordance with claim 15 wherein said trigger pulses, when generated, occur at intervals shorter than said first predetermined time interval.

17. A data bit sequence detector in accordance with claim 16 further including means connected to said second means and responsive to the absence of said second signal at the output of said second means for extending said first predetermined time interval.

18. A data bit sequence detector in accordance with claim 15 further including means connected to said second means and responsive to the absence of said second signal at the output of said second means for extending said first predetermined time interval.

19. A data bit sequence detector in accordance with claim 13 wherein said second predetermined time interval exceeds said first predetermined time interval.

20. A data bit sequence detector in accordance with claim 19 wherein said trigger pulses, when generated, occur at intervals shorter than said first predetermined time interval.

21. A data bit sequence detector in accordance with claim 20 further including means connected to said second means and responsive to the absence of said second signal at the output of said second means for extending said first predetermined time interval.

22. A data bit sequence detector in accordance with claim 13 further including means connected to said second means and responsive to the absence of said second signal at the output of said second means for extending said first predetermined time interval.

* * * * *